United States Patent Office 2,850,402
Patented Sept. 2, 1958

2,850,402
PROCESS FOR PRODUCING RED PIGMENTS

Anthony Giordano, Cleveland, Ohio, assignor to The Harshaw Chemical Company, Cleveland, Ohio, a corporation of Ohio No Drawing. Application January 22, 1957
Serial No. 635,127

6 Claims. (Cl. 106—301)

This invention relates to an improved process for producing red pigment from mercury sulfide and cadmium sulfide. More particularly the invention relates to an improved process for producing red pigments by calcining mercury sulfide and cadmium sulfide in the presence of an alkali metal sulfide.

Co-pending application filed April 6, 1956, entitled Mercury Containing Color and Pigment Production Process and bearing Serial No. 576,515 sets forth a method for producing red pigments by calcining mercury sulfide and cadmium sulfide in the presence of an alkali metal sulfide. The invention described herein is directed to an improved method for producing the red pigments according to the aforementioned patent application, the improvements greatly facilitating the obtainment of pigments having superior texture and greater color intensity and tinting strength than the red pigments produced according to the teachings of the co-pending application. Additionally, the invention is directed to certain refinements in the method of producing red pigments from cadmium sulfide, mercury sulfide and an alkali metal sulfide, the refinement being directed to insuring that comparable colors will be obtained from successive batch formulations directed to obtaining a pigment having a specific color.

Accordingly, it is an object of the invention to provide an improved process for producing red pigments by calcining cadmium sulfide, mercury sulfide and an alkali metal sulfide. Another object is to provide an improved process for producing red pigments from cadmium sulfide, mercury sulfide and an alkali metal sulfide characterized in that the pigments produced have a superior texture. Another object is to provide an improved process for manufacturing red pigments from cadmium sulfide and mercury sulfide by calcining the sulfides in the presence of an alkali metal sulfide, the red pigments produced being characterized by their improved color intensity in mass tone and superior tinting strength.

The improved pigments are prepared by forming an intimate mixture of mercury sulfide, cadmium sulfide and an alkali metal sulfide in an aqueous solution under conditions of pH ranging between 7.5 and 12. This may be accomplished in a ball mill or other suitable apparatus known to those skilled in the art. The alkali metal sulfide employed is one corresponding in formula to $M_2S_x$ wherein M is selected from potassium and sodium and $x$ is at least 4. The slurry of cadmium and mercury sulfides in the alkali metal sulfide solution is thereafter filtered to obtain a green cake having retained alkali metal sulfide solution associated therewith. The filtration and separation of the alkali metal sulfide solution from the cadmium and mercury sulfides is carried out to the point where the mol ratio of the retained alkali metal sulfide to cadmium sulfide ranges from about .001 to about 0.05. Thereafter, the green cake is dried and calcined preferably in an atmosphere of sulfur followed by washing of the calcined pigment to remove the soluble salts therefrom.

The mercury sulfide and cadmium sulfide employed to form the intimate mixture of the two components may be from any of the conventional sources known and employed for pigment purposes. In particular, however, the mercury sulfide should be substantially free of elemental mercury since it has been found that elemental mercury when present during the calcination of the mercury sulfide and cadmium sulfide causes the formation of dirty pigments. The cadmium sulfide may be employed alone or as associated with various extenders as for example barium sulfate. Thus, the so-called cadmium lithopones formed as for example by co-precipitation of cadmium sulfide and barium sulfate by the reaction of barium sulfide with cadmium sulfate may be employed according to the instant invention. The mercury sulfide and cadmium sulfide are employed in finely divided form and preferably as a slurry as is customary in the pigment arts for forming intimate mixtures. The amount of mercury sulfide employed in the production of the pigments generally correspond to a mercury sulfide to cadmium sulfide (HgS/CdS) ratio of from about .02 to about .25. Brighter colored reds having a considerable amount of yellow are formed when the mercury sulfide to cadmium sulfide ratio is about .02 whereas the darker colored pigments are formed when the ratio more closely approaches 0.25.

The pH conditions under which the mercury sulfide, cadmium sulfide and alkali metal sulfide solution are intimately mixed must range between a pH of 7.5 and 12 to obtain a proper texture in the calcined pigment. For example when the mercury sulfide and cadmium sulfide are intimately mixed in an alkali metal sulfide solution wherein the pH is less than about 7.5, the principal reactants, i. e., the cadmium and mercury sulfides appear to have a poor response to the subsequent calcination treatment and require the use of higher temperatures and/or greater length of time during the calcination treatment to obtain an adequate color and brightness. These more drastic calcination conditions, however, cause increased particle growth as well as loss of mercuric sulfide by sublimation, and consequently the development of a pigment having a coarser texture and lighter color. This, of course, is undesirable for the reason that the coarser textures are associated with weaker tinting strengths than are the finer textures. Similarly, when the intimate mixing of the principal components is accomplished under pH conditions in excess of about 12, the pigment develops a hard and coarse texture upon subsequent calcination and also exhibits an increase in the apparent density of the pigment. This increase in the apparent density is undesirable for the reason that the pigment is difficult to disperse in paint vehicles. Therefore, the broad range of pH set forth heretofore appears to be the limting range of pH outside of which unacceptable pigments are produced. Preferably the pH of the mixture of cadmium and mercury sulfides in the alkali metal sulfide solution ranges from about 8 to about 11 since the decreased tendency to respond to calcination appears to develop as the pH falls below about 8 and a coarser and harder texture tends to develop above a pH of about 11.

Preferably the mercury sulfide and cadmium sulfide are in slurry form prior to the intimate mixing in the alkali metal sulfide solution. As such it will be apparent that an alkali metal sulfide solution having a pH in excess of that desired in the final mixture may be employed, since the dilution of the alkali metal sulfide solution with the water associated with the slurried forms of mercury sulfide and cadmium sulfide will cause a material lowering of the pH. In any event, however, the resulting pH of the intimate mixture of cadmium and mercury sulfides and alkali metal sulfides should be between 7.5 and 12.

The alkali metal sulfide employed should have a formula corresponding to $M_2S_x$ wherein M is selected from potassium and sodium and $x$ is at least 4. It has been found that where the cadmium sulfide and mercury sulfide are dispersed in an alkali metal sulfide solution having lesser quantities of sulfur associated with the alkali metal upon subsequent filtration appreciable quantities of the mercury sulfide are lost with the filtrate. This loss of mercury sulfide directly influences the color of the pigment obtained, and, accordingly, in the commercial operations involving a filtration step, it is necessary to be very precise in the quantity of mercury sulfide incorporated and very precise in the degrees of deliquefying accomplished during the filtration step to avoid losses of mercury sulfide. However, when the alkali metal sulfide employed has a sulfur content in excess of 4 mols associated with the alkali metal, the mercury sulfide is substantially insoluble therein and these difficulties are minimized.

The filtration of the slurry of mercury sulfide and cadmium sulfide solution may be accomplished in known manners to obtain a green cake having retained alkali metal sulfide solution associated therewith. The retained alkali metal sulfide content of the alkali metal sulfide solution should correspond to a mol ratio of alkali metal sulfide to cadmium sulfide in the cake of from about .001 to about .05. When the amount of alkali metal sulfide solution retained with a green cake exceeds a mol ratio of alkali metal sulfide to cadmium sulfide ($M_2S_x$/CdS) of .05, the dried green cake tends to have crustations associated therewith and to have a hard and horny texture after quenching of the calcined product.

The alkali metal sulfide appears not only to catalyze the reaction between the mercury sulfide and cadmium sulfide but additionally appears to act as a color brightener and intensifier. Even greater color intensity and brightness may be obtained by conducting the calcination of the mercury sulfide, cadmium sulfide and alkali metal sulfide in a sulfur atmosphere. In such cases, the sulfur may be either mixed with the principal reactants initially or merely added to the charge in the calcination equipment, for example, in lump form.

The calcination of the principal ingredients may be conducted at temperatures generally ranging from about 460° C. to about 575° C. although preferably for the obtainment of the best texture the calcination is conducted at temperatures ranging from about 475° C. to about 530° C. In such cases the length of calcination period may vary from about 5 to about 45 minutes or longer.

As a special feature of the invention, it has been ascertained that sodium or potassium thiosulfate may be substituted in part for the alkali metal sulfide employed, and, in general, that the alkali metal thiosulfate may be substituted in amounts ranging up to about 50 mol percent of the alkali metal sulfide. The alkali metal thiosulfate appears also to act as a color brightener when employed in combination with an alkali metal sulfide. This is rather surprising in some respects since the use of an alkali metal thiosulfate alone does not appear to have any great advantage as a catalyst or brightener during the transformation, being definitely inferior to the use of an alkali metal sulfide alone or in combination with an alkali metal thiosulfate as a substitute for the alkali metal sulfide in amounts up to about 50 mol percent thereof. Thus, alkali metal thiosulfate may be substituted for the alkali metal sulfide and employed in combination therewith in amounts up to about 50 mol percent of the required alkali metal sulfide. Mixtures of potassium pentasulfide and potassium thiosulfate in proportions corresponding to that normally found in livers of sulfur, have been found to be especially suitable. In the case of such mixtures of the alkali metal sulfide and thiosulfate the filtration is conducted to obtain a green cake which has a molar sum of alkali metal sulfide and alkali metal thiosulfate such that the mol ratio of the sum to cadmium sulfide corresponds to the mol ratios of alkali metal sulfide to cadmium sulfide heretofore referred to.

The invention will be more fully understood as illustrated by the following examples:

*Example 1*

A medium red pigment of excellent color intensity in mass tone and having superior tinting strength was prepared by intimately mixing a 20 percent slurry of cadmium lithopone formed by the co-precipitation of cadmium sulfide and barium sulfate and containing 378 grams of cadmium lithopone, a 70 percent slurry containing 42.4 grams of mercury sulfide and a 10 percent solution of potassium pentasulfide. The mercury sulfide to cadmium sulfide molar ratio was .183 whereas the molar ratio of the potassium pentasulfide to cadmium sulfide in the slurry was 0.1. The slurry was then filtered to obtain a green cake having a solids content such that 8.85 grams of potassium pentasulfide was retained with the solution in the green cake. This green cake was then dried at about 85° C. and a 20 gram portion of the dried cake subjected to calcination at 500° C. for 18 minutes in the presence of ½ gram of added sulfur. After the calcination the pigment was quenched, washed in water and then pulverized.

Another 20 gram portion of the dried cake was similarly calcined, quenched, washed and pulverized except that no sulfur was added during calcination. The pigment thus produced, although being superior in mass tone and tinting strength was, nevertheless, less intense in color than when sulfur was added during the calcination.

*Example 2*

A medium light red pigment having superior color intensity in mass tone and a superior tinting strength was prepared by intimately mixing a 10 percent solids containing slurry of cadmium lithopone ($CdS \cdot BaSO_4$) amounting to 215 grams of cadmium lithopone, a 20 percent slurry of mercury sulfide amounting to 20 grams of mercury sulfide (HgS) and 84 grams of a sodium polysulfide solution prepared by dissolving 16 grams of sulfur in 92 grams of .10 percent by weight sodium sulfide ($Na_2S$) containing solution. The slurry was then filtered to the point where the sodium polysulfide retained with the green cake amounted to 2 percent by weight of the sum of the mercury sulfide and cadmium lithopone in the green cake. The cake was then dried at temperatures ranging from about 85° C. to about 100° C. and a 20 gram portion of the cake then calcined in the presence of ½ gram of sulfur at 500° C. for about 15 minutes. Following the calcination, the cake was quenched in water and the soluble solids washed therefrom. The washed cake was then dried and pulverized to pigment fineness.

Calcination and similar treatment of another 20 gram portion of the cake referred to in the prior paragraph, except that no sulfur was added to the calciner, produced a pigment having somewhat less intensity of color than when the sulfur was present.

*Example 3*

A dark red pigment having superior color intensity in mass tone and increased tinting strength was prepared by intimately mixing 120 grams of a 20 percent sulfurated potash solution having 2 mols of potassium pentasulfide present to 1 mol of potassium thiosulfate, 1890 grams of a 20 percent by weight cadmium lithopone slurry containing 378 grams of cadmium lithopone on a dried basis, and a 70 percent slurry of mercury sulfide containing 46.4 grams of mercury sulfide. The slurry was thoroughly mixed and then filtered so as to obtain a cake having retained therewith about 2.1 percent of sulfurated potash based on the weight of the dried green cake. The green cake was then dried at about 85° C. and a 20 grams portion thereof calcined with ½ gram of sulfur at about 500° C. for about 18 minutes. Thereafter, the calcined product was quenched in cold water, washed to remove the soluble salts, dried and pulverized to pigment fineness.

Diluents and extenders are not essential but may be present without losing the benefits of the invention and hence are not excluded. The term "essentially consisting of" is therefore intended to include all diluents, extenders and equivalents so long as the essentials of the invention are present and characteristic benefits are realized.

I claim:

1. In a process wherein mercury sulfide, cadmium sulfide and an alkali metal sulfide are calcined together to develop a red colored pigment, the improvement comprising forming an intimate mixture essentially consisting of cadmium sulfide, mercury sulfide and an aqueous solution of an alkali metal sulfide having a formula $M_2S_x$ wherein M is selected from sodium and potassium and $x$ is at least 4, the amount of solution being such as to form a slurry having a pH between 7.5 and 12, removing from said slurry a sufficient portion of the liquid phase to obtain a green cake having retained alkali metal sulfide in an amount corresponding to a mol ratio of alkali metal sulfide to cadmium sulfide in said cake of from about .001 to about .05 and thereafter drying and calcining said cake.

2. A process according to claim 1 wherein an alkali metal thiosulfate selected from the group consisting of sodium thiosulfate and potassium thiosulfate is substituted for the alkali metal sulfide in said aqueous solution in amounts up to about 50 mol percent thereof, wherein a sufficient portion of the liquid phase is removed from the slurry to obtain a cake having alkali metal sulfide and alkali metal thiosulfate retained therewith in an amount corresponding to a mol ratio of the sum of the alkali metal sulfide and alkali metal thiosulfate to cadmium sulfide of from about .001 to about .05, and wherein the calcination is conducted at a temperature from 460° C. to 575° C. in a sulfur atmosphere.

3. In a process wherein mercury sulfide, cadmium sulfide and an alkali metal sulfide are calcined together to develop a red colored pigment, the improvement comprising forming an intimate mixture essentially consisting of cadmium sulfide, mercury sulfide, and an aqueous solution of an alkali metal sulfide having a formula $M_2S_x$ wherein M is selected from sodium and potassium and $x$ is at least 4, the amount of solution being such as to form a slurry having a pH between 7.5 and 12, the mercury sulfide and cadmium sulfide being mixed in a mol ratio of mercury sulfide to cadmium sulfide (HgS/CdS) of from about .02 to about .25, removing from said slurry a sufficient portion of the liquid phase to obtain a green cake having retained alkali metal sulfide in an amount corresponding to a mol ratio of alkali metal sulfide to cadmium sulfide in said cake of from about .001 to about .05 and thereafter drying said cake and calcining said dried cake at temperatures ranging from about 460° C. to about 575° C. in an atmosphere of sulfur.

4. In a process wherein mercury sulfide, cadmium sulfide and an alkali metal sulfide are calcined together to develop a red colored pigment, the improvement comprising forming an intimate mixture essentially consisting of cadmium sulfide, mercury sulfide and an aqueous solution of an alkali metal sulfide having a formula $M_2S_x$ wherein M is selected from sodium and potassium and $x$ is at least 4, the amount of solution being such as to form a slurry having a pH between 8 and 11, removing from said slurry a sufficient portion of the liquid phase to obtain a green cake having retained alkali metal sulfide in an amount corresponding to a mol ratio of alkali metal sulfide to cadmium sulfide in said cake of from about .001 to about .05 and thereafter drying and calcining said cake.

5. A process according to claim 4 wherein an alkali metal thiosulfate selected from the group consisting of sodium thiosulfate and potassium thiosulfate is substituted for the alkali metal sulfide in said aqueous solution in amounts up to about 50 mol percent thereof, wherein a sufficient portion of the liquid phase is removed from the slurry to obtain a cake having alkali metal sulfide and alkali metal thiosulfate retained therewith in an amount corresponding to a mol ratio of the sum of the alkali metal sulfide and alkali metal thiosulfate to cadmium sulfide of from about .001 to about .05, and wherein the calcination is conducted at a temperature from 475° C. to 530° C. in a sulfur atmosphere.

6. In a process wherein mercury sulfide, cadmium sulfide and an alkali metal sulfide are calcined together to develop a red colored pigment, the improvement comprising forming an intimate mixture essentially consisting of cadmium sulfide, mercury sulfide, and an aqueous solution of an alkali metal sulfide having a formula $M_2S_x$ where M is selected from sodium and potassium and $x$ is at least 4, the amount of solution being such as to form a slurry thereof having a pH between 8 and 11, the mercury sulfide and cadmium sulfide being mixed in a mol ratio of mercury sulfide to cadmium sulfide (Hg/CdS) of from about .02 to about .25, removing from said slurry a sufficient portion of the liquid phase to obtain a green cake having retained alkali metal sulfide in an amount corresponding to a mol ratio of alkali metal sulfide to cadmium sulfide in said cake of from about .001 to about .05 and thereafter drying said cake and calcining said dried cake at temperatures ranging from about 475° C. to about 530° C. in an atmosphere of sulfur.

References Cited in the file of this patent

UNITED STATES PATENTS

| | | |
|---|---|---|
| 1,894,931 | O'Brien | Jan. 17, 1933 |
| 2,115,080 | O'Brien | Apr. 26, 1938 |
| 2,226,573 | O'Brien | Dec. 31, 1940 |
| 2,306,109 | Long | Dec. 22, 1942 |

OTHER REFERENCES

Article by Rittner et al. on studies on the coprecipitation of cadmium mercuric sulfides. On pages 537–543 of Physical Chemistry (1943).

Vol. X, January 1927, of the Journal of Oil and Color Chemists Association. Pages 1–14 inclusive. Article by Dudley Ward entitled "Cadmium Colours and Their Suggested Application to the Paint Industry."

UNITED STATES PATENT OFFICE
Certificate of Correction

Patent No. 2,850,402                                                    September 2, 1958

Anthony Giordano

It is hereby certified that error appears in the printed specification of the above numbered patent requiring correction and that the said Letters Patent should read as corrected below.

Column 4, line 39, Example 2, for "($Cds \cdot BaSO_4$)" read —($CdS \cdot BaSO_4$)—; column 6, line 33, for "where" read —wherein—; line 37, for "$Hg/CdS$)" read —($HgS/CdS$)—.

Signed and sealed this 4th day of November 1958.

[SEAL]

Attest:
KARL H. AXLINE,
*Attesting Officer.*

ROBERT C. WATSON,
*Commissioner of Patents.*